US009082223B2

(12) United States Patent
McCarty et al.

(10) Patent No.: US 9,082,223 B2
(45) Date of Patent: Jul. 14, 2015

(54) SMOOTH MANIPULATION OF THREE-DIMENSIONAL OBJECTS

(71) Applicant: DreamWorks Animation LLC, Glendale, CA (US)

(72) Inventors: Morgwn Quin McCarty, Redwood City, CA (US); Alexander P. Powell, Los Angeles, CA (US)

(73) Assignee: DreamWorks Animation LLC, Glendale, CA (US)

( * ) Notice: Subject to any disclaimer, the term of this patent is extended or adjusted under 35 U.S.C. 154(b) by 162 days.

(21) Appl. No.: 13/841,927

(22) Filed: Mar. 15, 2013

(65) Prior Publication Data

US 2014/0267083 A1    Sep. 18, 2014

(51) Int. Cl.
*G06T 19/20* (2011.01)
*G06F 3/041* (2006.01)

(52) U.S. Cl.
CPC ............. *G06T 19/20* (2013.01); *G06F 3/041* (2013.01); *G06T 2219/2016* (2013.01)

(58) Field of Classification Search
CPC . G06T 19/20; G06T 2219/2016; G06T 3/041; G06T 3/0412; G06T 3/0416; G06T 3/04842; G06T 3/04845; G06T 3/0487
USPC ................. 345/156, 173; 715/764, 765, 767
See application file for complete search history.

(56) References Cited

U.S. PATENT DOCUMENTS

| | | | |
|---|---|---|---|
| 6,295,069 B1 * | 9/2001 | Shirur | 345/420 |
| 8,451,268 B1 * | 5/2013 | Reisman et al. | 345/419 |
| 2009/0315834 A1 * | 12/2009 | Nurmi et al. | 345/173 |
| 2010/0283750 A1 * | 11/2010 | Kang et al. | 345/173 |
| 2011/0037691 A1 * | 2/2011 | Kobayashi et al. | 345/156 |
| 2011/0041098 A1 * | 2/2011 | Kajiya et al. | 715/849 |
| 2011/0102464 A1 * | 5/2011 | Godavari | 345/650 |
| 2012/0262458 A1 * | 10/2012 | Fowler et al. | 345/427 |
| 2012/0327122 A1 * | 12/2012 | Imamura | 345/649 |
| 2013/0069987 A1 * | 3/2013 | Choe | 345/649 |
| 2013/0076668 A1 * | 3/2013 | Maeda | 345/173 |
| 2013/0093756 A1 * | 4/2013 | Davidson | 345/419 |
| 2013/0222363 A1 * | 8/2013 | Chu et al. | 345/419 |
| 2014/0078102 A1 * | 3/2014 | Araki | 345/174 |
| 2014/0137050 A1 * | 5/2014 | Alhashash | 715/848 |
| 2014/0245217 A1 * | 8/2014 | Asahara | 715/781 |

\* cited by examiner

*Primary Examiner* — Tom Sheng
(74) *Attorney, Agent, or Firm* — Morrison & Foerster LLP (57) ABSTRACT

Systems and methods for manipulating a virtual three-dimensional (3D) object in a virtual 3D space are provided. A representation of the 3D object is displayed on a display. A non-hemispherical arcball having a surface is determined. The non-hemispherical arcball is associated with the representation of the 3D object. A pointing device is detected at a first position and at a second position. The first position of the pointing device is translated onto a first location on the surface of the non-hemispherical arcball. The second position of the pointing device is translated onto a second location on the surface of the non-hemispherical arcball. A rotation of the representation of the 3D object is displayed on the display, the rotation based on a path of travel between the first location and the second location along the surface of the non-hemispherical arcball.

39 Claims, 6 Drawing Sheets

SMOOTH MANIPULATION OF THREE-DIMENSIONAL OBJECTS

BACKGROUND

1. Field

The present disclosure relates to the manipulation of virtual three-dimensional (3D) objects, and, in one particular example, to the manipulation of the orientation of virtual 3D objects using a non-hemispherical arcball.

2. Related Art

Developing and animating 3D scenes requires the placement and movement of virtual 3D objects. This typically requires changing the orientation, position, and scale of the objects in a virtual scene or in an object editing environment. The orientation, position, and scale of objects are manipulated through rotation, translation, and scaling techniques.

One way for a user to achieve these manipulations is to directly enter numerical values corresponding to the desired manipulation. For example, a user can change the orientation of an object in 3D space in a computer program by selecting the object and indicating values for three rotation properties, each of which control the rotation about an individual axis X, Y, or Z. While directly entering numerical values for rotation provides a precise method for manipulating the orientation of a 3D object, it presents numerous challenges. For example, the interface is not user-friendly for a user who is not intimately familiar with the rotation settings.

Another way for a user to manipulate a virtual 3D object is to use a pointing device. A change in the location of the pointing device along a detection surface can be used to change the orientation of the object in 3D space. When the user selects two locations on the detection surface using the pointing device, the computer program can rotate the 3D object using the coordinates of the two locations. While using a pointing device for manipulating a 3D object is much more user friendly than directly entering numerical values, it is challenging for users to manipulate the object with a high degree of precision.

Existing systems fail to provide user-friendly manipulation of virtual 3D objects that provide a high degree of precision. Accordingly, a technique for smoothly manipulating 3D objects in 3D space that is user-friendly, intuitive, and precise is highly desirable.

SUMMARY

Processes for manipulating a virtual three-dimensional (3D) object in a virtual 3D space are described. One example process may include displaying a representation of the 3D object on a display. A non-hemispherical arcball having a surface is determined. The non-hemispherical arcball is associated with the representation of the 3D object. A pointing device is detected at a first position and at a second position. The first position of the pointing device is translated onto a first location on the surface of the non-hemispherical arcball. The second position of the pointing device is translated onto a second location on the surface of the non-hemispherical arcball. A rotation of the representation of the 3D object is displayed on the display, the rotation based on a path of travel between the first location and the second location along the surface of the non-hemispherical arcball.

Systems and computer-readable storage media for manipulating a virtual 3D object in a virtual 3D space are also described.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to processes for manipulating a virtual three-dimensional (3D) object in a virtual 3D space. One example process may include displaying a representation of the 3D object on a display. A non-hemispherical arcball having a surface is determined. The non-hemispherical arcball is associated with the representation of the 3D object. A pointing device is detected at a first position and at a second position. The first position of the pointing device is translated onto a first location on the surface of the non-hemispherical arcball. The second position of the pointing device is translated onto a second location on the surface of the non-hemispherical arcball. A rotation of the representation of the 3D object is displayed on the display, the rotation based on a path of travel between the first location and the second location along the surface of the non-hemispherical arcball.

Figure 1:
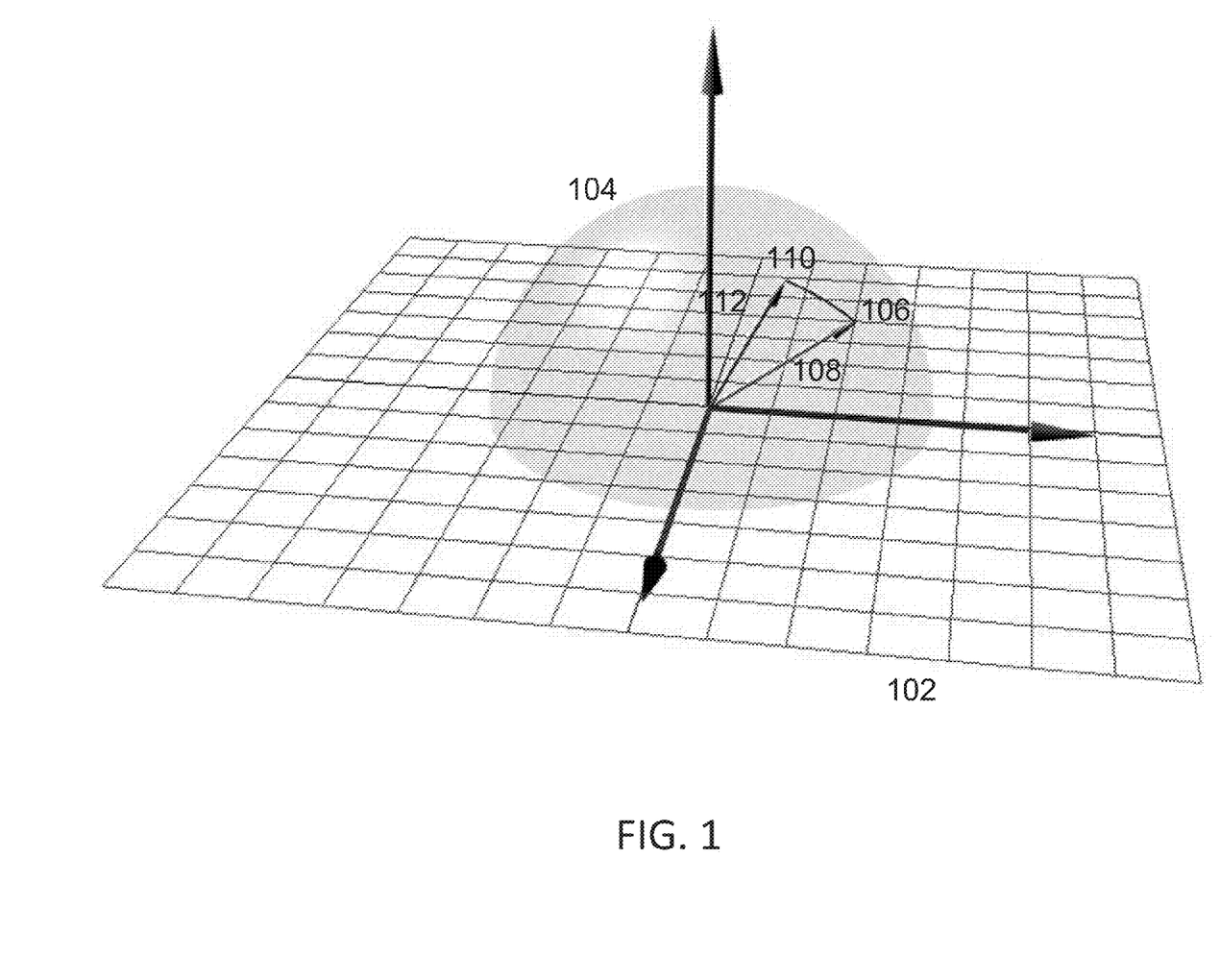
FIG. 1 illustrates a conventional hemispherical arcball.

FIG. 1 illustrates a conventional hemispherical arcball 104. The conventional hemispherical arcball 104 is illustrated with reference to a computer screen surface 102. The conventional hemispherical arcball 104 provides an imprecise method for rotating an object in 3D space. At a high level, the hemispherical arcball is implemented by creating a virtual sphere around a virtual 3D object. The 3D object is typically displayed on the screen. At any one time, the user has access to one-half of the sphere—the hemispherical arcball 104. As a result of the hemispherical shape of the arcball 104, the cross-section of the arcball's virtual intersection with the screen surface 102 is a circle and the falloff of the hemispherical arcball 104 near the virtual intersection with the screen surface 102 is nearly vertical.

A user uses a mouse pointing cursor to select a point 106 on the hemispherical arcball 104. The user then drags the cursor to a different location on the hemispherical arcball 104, such as point 110. As the user drags the point on the screen along the surface of the sphere, the object rotates to follow an equivalent rotation of the sphere. This rotation may be calculated using vectors 108 and 112, which correspond to points 106 and 110 respectively.

While this technique provides an intuitive and user-friendly experience, the user is afforded only a low level of precision for rotating the object. The lack of precision is particularly emphasized for rotations conducted near the edge of the hemispherical arcball. As the pointing cursor reaches the edge of the hemisphere, the degree of rotation in 3D space of the object per incremental change in cursor position in two-dimensional (2D) space rapidly increases. Thus at the edge of the hemispherical arcball 104, a small change in the movement of a cursor along the screen surface 102 cases a large change in the rotation of the object associated with the hemispherical arcball 104. This phenomenon is described in greater detail below.

Figure 2:
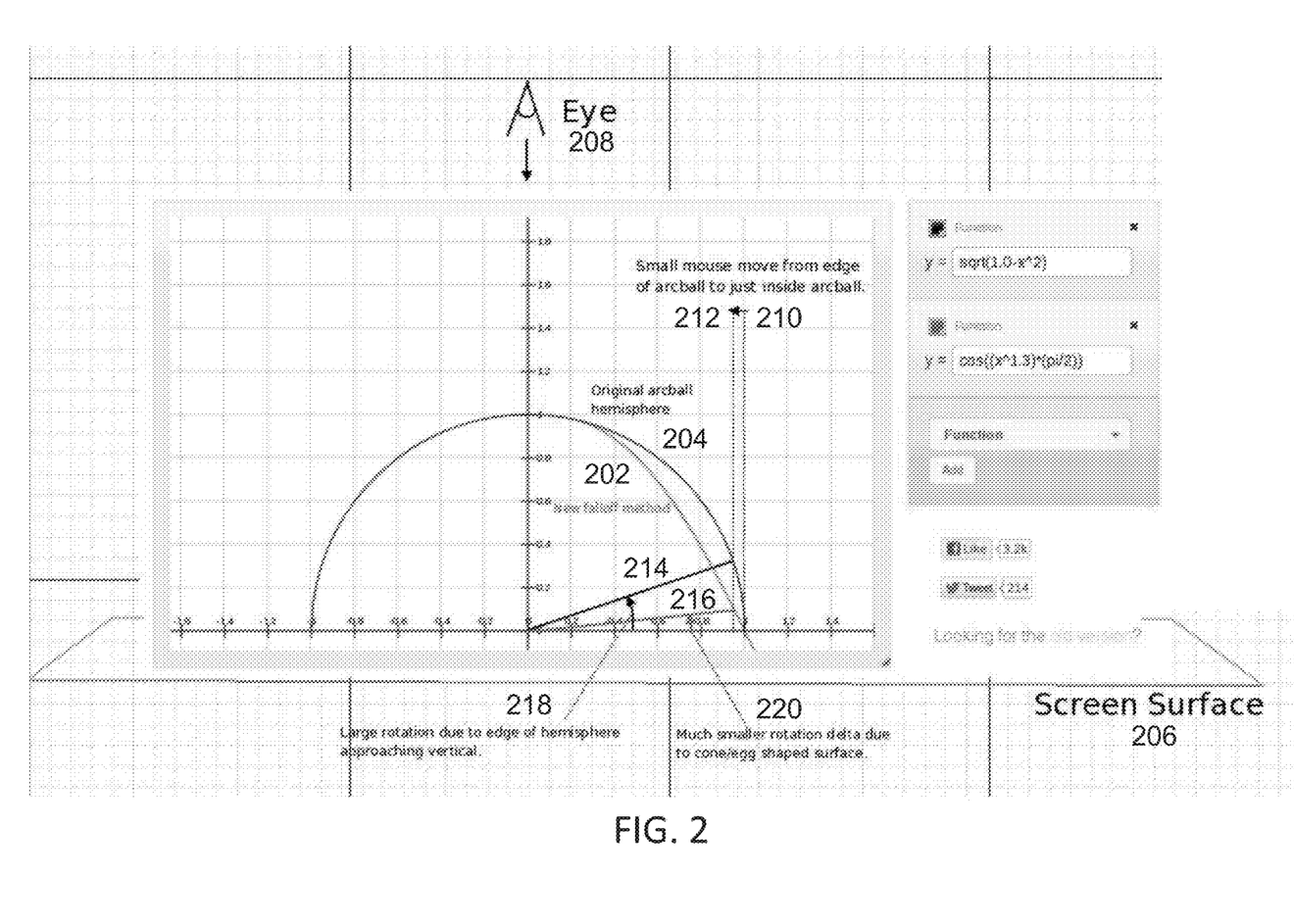
FIG. 2 illustrates a comparison between a conventional hemispherical arcball and a non-hemispherical arcball.

FIG. 2 illustrates a comparison between a conventional hemispherical arcball and a non-hemispherical arcball. The conventional hemispherical arcball 104 is illustrated in 2D for ease of understanding as hemispherical arcball 204. A user may be positioned such that the user is viewing the screen surface 206 from a location 208. As the user drags a cursor from point 210 to point 212 along the screen surface 206, an object associated with the hemispherical arcball 204 is rotated. This exemplary movement of the cursor along the screen surface 206 begins at the edge of the hemispherical arcball 206 and ends 10 pixels inside the hemispherical arcball 204. For clarity, the 10 pixel movement is measured along the screen surface 206.

When this 10 pixel cursor movement along the screen surface 206 is projected onto the hemispherical arcball 204, it results in an angle of rotation 218 from the x-axis to vector 214 of 18 degrees in 2D. Thus, an object associated with the hemispherical arcball 204 will be rotated 18 degrees as a result of the 10 pixel cursor movement from point 210 to point 212. Note that a 10 pixel movement along the screen surface 206 that is not near the edge of the hemispherical arcball 204 would result in an angle of rotation that is significantly less than 18 degrees. In particular, dragging the cursor near the edge of the hemispherical arcball 204 rotates the associated object much more rapidly than dragging the cursor near the center of the hemispherical arcball 204. This rapid rotation at the edge of the hemispherical arcball 204 inhibits the manipulation of the object associated with the hemispherical arcball 204 from being smooth and prevents precise control of the rotation of the associated object.

In contrast to the hemispherical arcball 204, FIG. 2 illustrates a non-hemispherical arcball 202 that provides added precision. As the user drags the cursor from point 210 to point 212 along the same screen surface 206, an object associated with the non-hemispherical arcball 202 is rotated significantly less than the object associated with the hemispherical arcball 204. In particular, for the non-hemispherical arcball 202, the cursor movement of 10 pixels from point 210 to point 212 on the screen surface 206 results in an angle of rotation 220 from the x-axis to vector 216 of only 5 degrees in 2D.

In this example, the 5 degrees of rotation is caused by the same movement of 10 pixels of the cursor on the screen surface 206 as described in relation to the hemispherical arcball 204. Note that a 10 pixel movement along the screen surface 206 that is not near the edge of the non-hemispherical arcball 202 results in an angle of rotation that is similar to 5 degrees. Because the degrees of rotation along the edge and the center of the non-hemispherical arcball 202 are more consistent than the degrees of rotation along the edge and the center of the hemispherical arcball 204, the non-hemispherical arcball 202 provides more precision and a better user experience.

Figure 3:
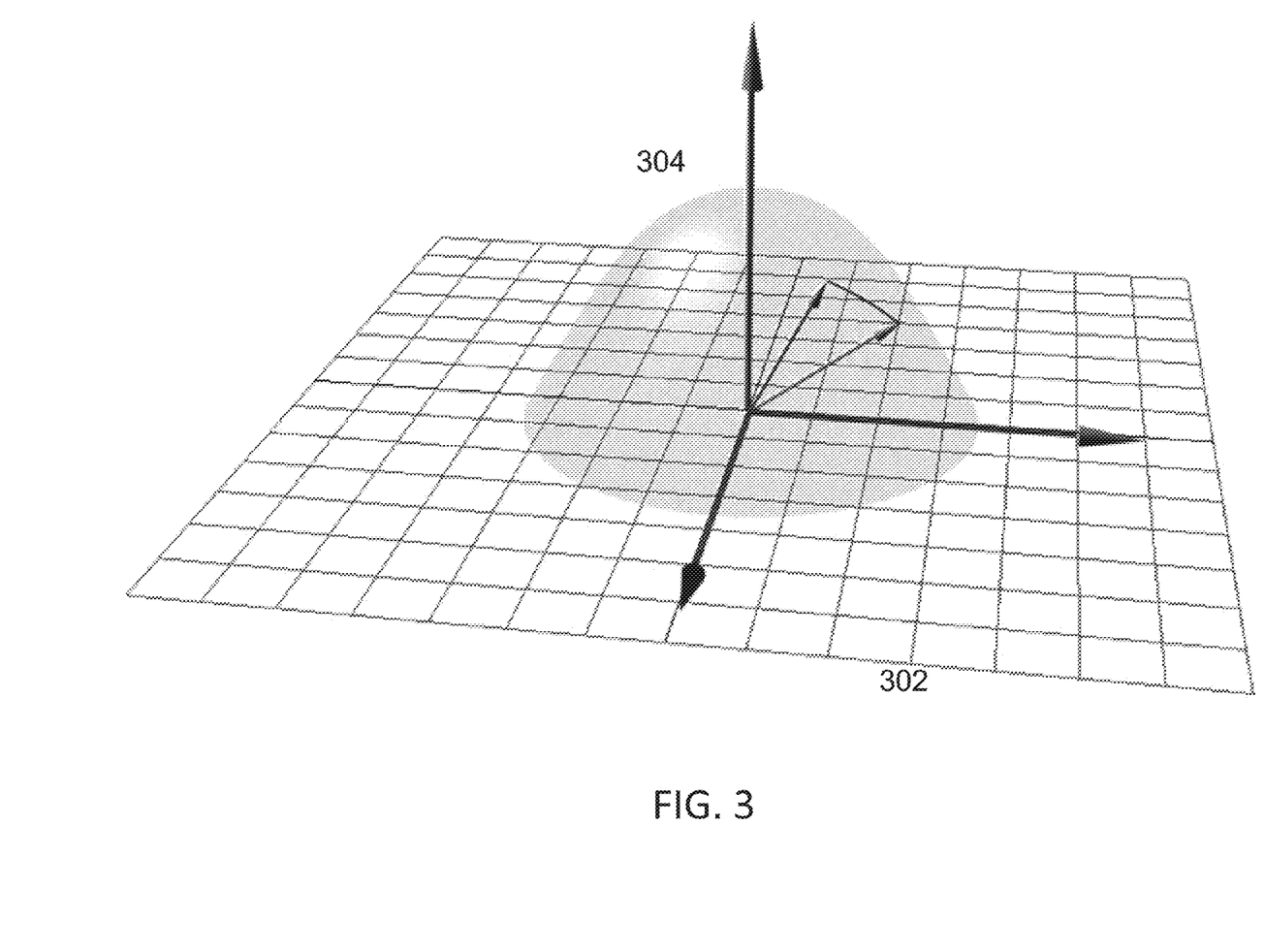
FIG. 3 illustrates an exemplary non-hemispherical arcball in 3D.

FIG. 3 illustrates an exemplary non-hemispherical arcball 304 in 3D. The concepts described in relation to the non-hemispherical arcball 202 in FIG. 2 can be extended into 3D to allow rotation of an object in 3D space, such as on X, Y, and Z-axes. The arcball is illustrated with reference to a display screen 302. Unlike a conventional hemisphere, the non-hemispherical arcball uses a falloff technique that moderates the degrees of rotation an object experiences as a user interacts with the arcball.

Referring to FIG. 3, various shapes that have differing falloffs can be used for the 3D non-hemispherical arcball in order to achieve desirable results. A non-hemispherical arcball has a base, which is two-dimensional. This base is circular and has a center point. Unlike a hemisphere, the radius of the 3D non-hemispherical arcball as measured from the center point of the base to the surface of the non-hemispherical arcball is not constant over the surface of the non-hemispherical arcball.

In one exemplary implementation, a user uses a touch-screen display device to manipulate a virtual 3D object in a virtual 3D space. The representation of the object is displayed on the screen. The user places the device into a "manipulation mode," by selecting a toggle that enables interpreting the motion of a pointing device as a rotation of the object, rather than a translation, resizing, or alternate manipulation. Enabling the manipulation mode causes the system to determine the shape, size, and location of a non-hemispherical arcball and to associate the arcball with the representation of the object. The user places the pointing device, such as a finger, on or near the object at one position on the screen and drags the pointing device to another position on the screen. The system detects these two positions (or the transition between the two points) and translates the positions into two locations on the surface of the non-hemispherical arcball. These two locations on the surface of the arcball are then used to determine the degrees of rotation that should be applied to the object. The rotation to be applied to the object associated with the non-hemispherical arcball may be in one, two, or three dimensions. The display is updated to show the rotated object in accordance with the input rotation using the pointing device. The visual rotation of the object in response to the input from the user may be in near real-time.

As an alternative to determining the shape, size, and location of the non-hemispherical arcball as a result of enabling a manipulation mode, the non-hemispherical arcball may be determined in response to the user initially placing the pointing device on or near the object on the display screen. The shape, size, and/or location characteristics of the non-hemispherical arcball are selected based on the location of the initial touch on a touch screen with respect to the object. For example, the size and shape of the arcball is selected to fully or partially encompass the object.

In one example, a non-hemispherical arcball that is associated with an object does not fully encompass the object. When a user selects a location on the object in order to rotate the object, the non-hemispherical arcball grows to a size such that the selected location is within the scope of the arcball. This allows the user to manipulate the object even when the arcball is not visually displayed on the display.

In the non-hemispherical arcball example illustrated in FIG. 2, the 2D arcball is formulated using an equation of $y=\cos((x^{1.3})*(\pi/2))$ for $-1 \le x \le 1$. This same equation can be extended into three dimensions such that the non-hemispherical arcball is generated in 3D.

A traditional hemispherical arcball is described by the following equations:

$$distFromCircleCenter = sqrt(x \times x + y \times y)$$

$$z = sqrt(1.0 - distFromCircleCenter)$$

where z may be conceptualized as extended orthogonally from the display screen. Note that sqrt(1.0−x) is the function for a circle of radius one. This results in a vector V(x, y, z) which may be plotted. Note that the hemispherical arcball has a slope of virtually 90 degrees near the edge of the arcball.

One example of a non-hemispherical arcball is described by the following equations:

$$distFromCircleCenter = sqrt(x \times x + y \times y)$$

$z = cos(distFromCircleCenter^{1.3} \times \pi/2)$. This results in a vector V(x, y, z) which is plotted. One of ordinary skill in the art will appreciate that the distFromCircleCenter variable may be raised to various power values. For example, a power value may be selected from the range between 1.2 and 1.4.

One of ordinary skill in the art will also appreciate that these are only one set of equations for a non-hemispherical arcball and that other equations and variations may also be implemented. In some examples, the non-hemispherical arcball equations result in a slope of less than 90 degrees at the edge of the arcball (e.g., at x=1). In other examples, a non-hemispherical arcball has a slope between 70 degrees and 85 degrees at the edge of the arcball. In yet another example, a non-hemispherical arcball has a slope between 45 degrees and 70 degrees at the edge of the arcball. In yet another example, the non-hemispherical arcball has a slope between 25 degrees and 45 degrees at the edge of the arcball. The sharper the slope near the edge of the arcball, the more rapidly an object associated with the arcball will rotate for a movement near the edge of the arcball.

Additionally, two or more segments (e.g., splines) may be used to create a falloff curve for a non-hemispherical arcball that is not readily modeled with a single equation. These two or more segments may be used to create a more tailored look or feel for rotations using the non-hemispherical arcball.

Figure 4:
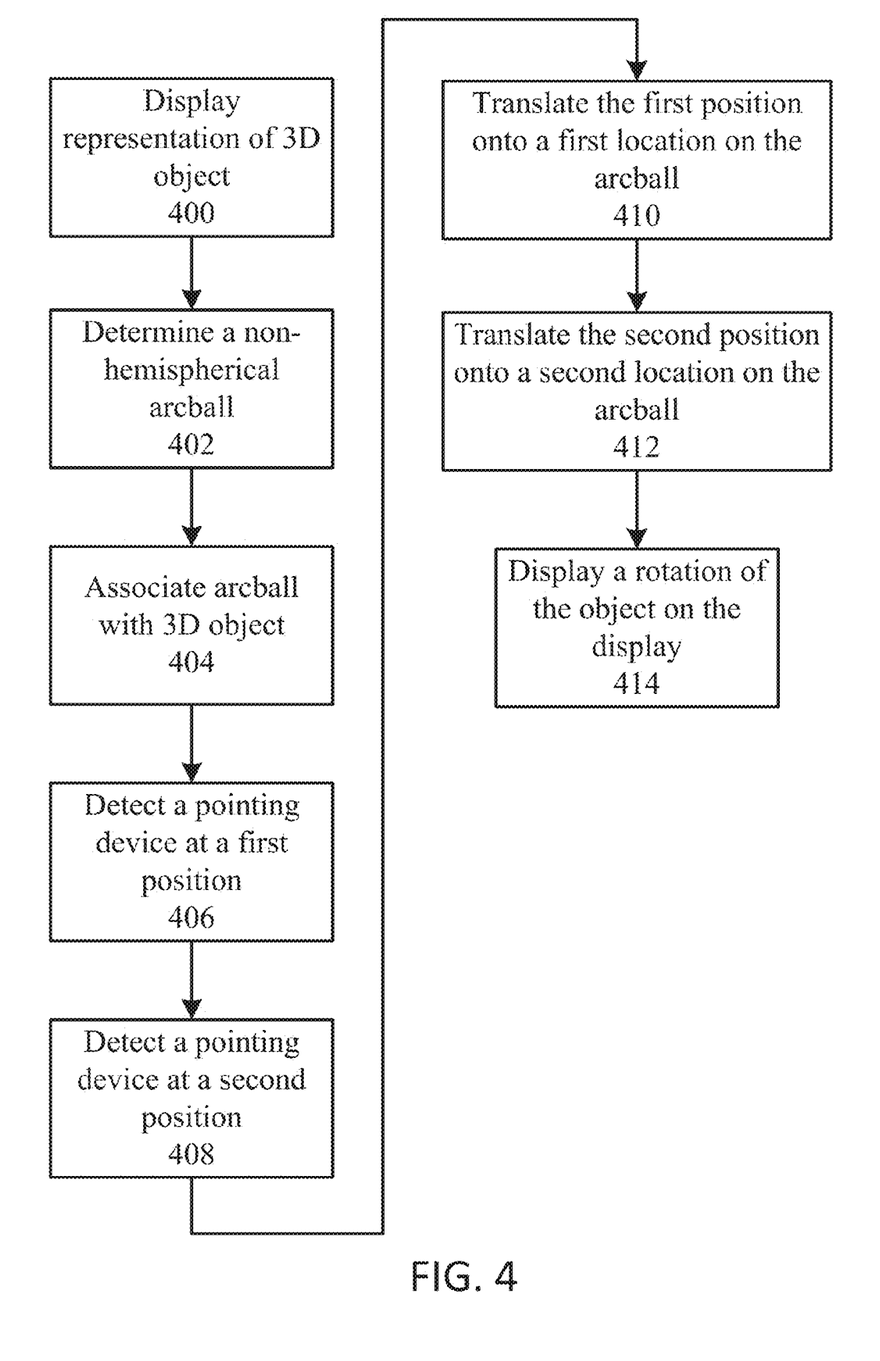
FIG. 4 illustrates an exemplary process for rotating an object using a non-hemispherical arcball.

FIG. 4 illustrates an exemplary process for rotating an object using a non-hemispherical arcball. For example, the process is implemented using electronics hardware or instructions stored on a non-transitory computer-readable storage medium that is readable by a computer processor. The process is used for manipulating a virtual 3D object in a virtual 3D space. At block 400, a representation of the 3D object is displayed on a display. The 3D object is based on a polygon mesh that is stored in computer memory. The polygon mesh defines the shape of the object.

At block 402, a non-hemispherical arcball is determined. The non-hemispherical arcball has a surface, which may be substantially smooth. The non-hemispherical arcball may be visibly displayed on the display. In other examples, the arcball may be partially transparent or not visually displayed. At block 404, the non-hemispherical arcball is associated with the representation of the 3D object. By associating the non-hemispherical arcball with the representation of the 3D object, multiple 3D objects can be displayed on a single computer screen, with each 3D object having its own associated arcball.

At block 406, a pointing device is detected at a first position. For the example where a computer mouse is used, the position of the pointing device may be detected and stored in memory when the user clicks a button of the mouse. In another example where a touch screen is used, the position of the pointing device may be detected and stored in memory when the user touches the touch screen with their finger or a pointer. At block 408, a second position of a pointing device is detected and stored in memory. For example, the second position may be detected and stored when the user performs another click of the computer mouse or when the user drags the computer mouse to a different position and releases the button. In another example, the second position may be detected when the user touches a second position on the touch screen or if the user drags their finger or pointer to the second position and releases the touch on the touch screen.

At block 410, the first position is translated onto a first location on the surface of the non-hemispherical arcball. The first location may be a 3D location having X, Y, and Z-axis values. At block 412, the second position is translated onto a second location on the surface of the non-hemispherical arcball. The second location may also be a 3D location having X, Y, and Z-axis values. One of ordinary skill will appreciate that a location in 3D space may also be stored using other techniques.

At block 414, a rotation of the object is displayed and recorded in computer memory. For example, the rotation may be a fluid, animated rotation or may be a jump from the original orientation of the object to the rotated orientation of the object. The rotation of the object is based on the first location and the second location. More specifically, the rotation may be based on a path of travel between the first location and the second location along the surface of the non-hemispherical arcball. Thus, the shape of the hemispherical arcball plays a role in the rotational movement of the object.

Figure 5:
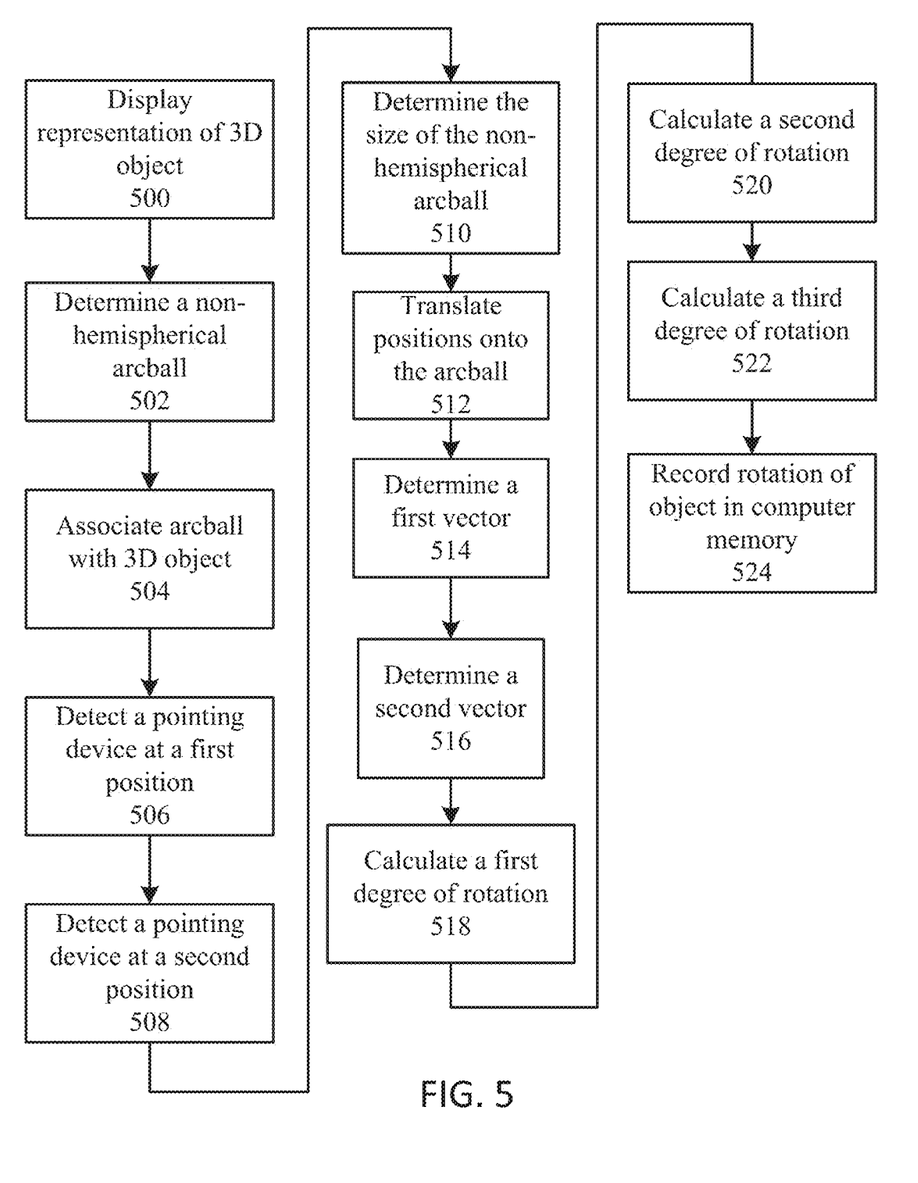
FIG. 5 illustrates another exemplary process for rotating an object using a non-hemispherical arcball.

FIG. 5 illustrates another exemplary process for rotating an object using a non-hemispherical arcball. The process is used for manipulating a virtual 3D object in a virtual 3D space. At block 500, a representation of the 3D object is displayed on a display. For example, the 3D object may be based on a polygon mesh that is stored in computer memory. The polygon mesh defines the shape of the object.

At block 502, a non-hemispherical arcball is determined. The non-hemispherical arcball has a surface, which may be substantially smooth. The non-hemispherical arcball may be visibly displayed on the display or may not be visibly displayed. The base of the non-hemispherical arcball has a circular circumference and a center point that is equidistant from all points on the circumference of the base. The radius of the non-hemispherical arcball varies as measured from the center point of the base to the surface of the non-hemispherical arcball. For example, the radius of the non-hemispherical arcball may be longer near the edge of the surface of the non-hemispherical arcball than near the center of the surface of the non-hemispherical arcball.

At block 504, the non-hemispherical arcball is associated with the representation of the 3D object. The non-hemispherical arcball may be placed in 3D space at a placement location determined in 3D space. The placement location may be based on the center of the representation of the 3D object in the 3D space. This way, the non-hemispherical arcball may be positioned such that it is centered with the 3D object.

At block 506, a pointing device is detected at a first position. For the example where a computer mouse is used, the position of the pointing device may be detected and stored in memory when the user clicks a button of the mouse. In another example where a touch screen is used, the position of the pointing device may be detected and stored in memory when the user touches the touch screen with their finger or a pointer. At block 508, a second position of a pointing device is detected and stored in memory. For example, the second position may be detected and stored when the user performs another click of the computer mouse or when the user drags the computer mouse to a different position and releases the button. In another example, the second position may be detected when a user touches the second position on a touch screen or if the user drags their finger or pointer to the second position and releases the touch on the touch screen. The shape and size of the non-hemispherical arcball may be based on the first position, as described below. Thus, the non-hemispherical arcball may be resized or generated based on the first position.

At block 510, the size of the non-hemispherical arcball is determined. The size of the non-hemispherical arcball may be based on the first position of the pointing device. For example, the non-hemispherical arcball may be sized such that the base of the non-hemispherical arcball expands beyond a projection of the representation of the 3D object in 2D space. The size and/or shape of the non-hemispherical arcball may also be selected such that it fully encapsulates the representation of the 3D object.

At block 512, the first position is translated onto a first location on the surface of the non-hemispherical arcball. The first location may be a 3D location having X, Y, and Z-axis values. At block 512, the second position is also translated onto a second location on the surface of the non-hemispherical arcball. The second location may also be a 3D location having X, Y, and Z-axis values. One of ordinary skill will appreciate that a location in 3D space may also be stored using other techniques.

At block 514, a first vector is determined. The first vector extends from the center of the base of the non-hemispherical arcball to the first location on the surface of the non-hemispherical arcball. At block 516, a second vector is determined. The second vector extends from the center of the base of the non-hemispherical arcball to the second location on the surface of the non-hemispherical arcball.

At block 518, a first degree of rotation is calculated in a first dimension. The first degree of rotation is calculated by determining a first angle between the first vector and the second vector. At block 520, a second degree of rotation is calculated in a second dimension. The second degree of rotation is calculated by determining a second angle between the first vector and the second vector. At block 522, a third degree of rotation is calculated in a third dimension. The third degree of rotation is calculated by determining a third angle between the first vector and the second vector. For example, the first, second, and third dimensions may be X, Y, and Z in 3D space.

At block 524, the rotation of the object is recorded in computer memory. The rotation of the object may also be displayed on the screen for the user to view. Rotating the representation of the 3D object is based on one or more of the first degree of rotation, the second degree of rotation, and the third degree of rotation. The rotation value of the object may be stored in association with the mesh data structure, which is associated with the object.

In one example, the rotation may be a fluid, animated rotation or may be a jump from the original orientation of the object to the rotated orientation of the object. The rotation of the object is based on the first location and the second location. More specifically, the rotation may be based on a path of travel between the first location and the second location along the surface of the non-hemispherical arcball. Thus, the shape of the non-hemispherical arcball plays a role in the rotational movement of the object.

In another example, the system repeatedly recomputes the rotation of the object from a position detected on the screen when a button of an input mouse pointer is pressed to various locations as the input mouse pointer moves along the surface of the display screen.

In this example, the current 3D rotation of an object associated with the non-hemispherical arcball is saved in memory. The system detects a button press of the pointer. The position of the pointer at the time of the button press is translated onto the surface of the non-hemispherical arcball. A 3D vector is computed from the center of the base of the arcball to the translated location on the surface of the arcball. This vector is stored in memory as the original 3D vector. As the system detects movement of the pointer, the system computes additional 3D vectors from the center of the base of the arcball to locations on the surface of the arcball on which the mouse pointer have been translated. For one or more of these additional 3D vectors, the system computes a 3D rotation based on the original 3D vector and the additional 3D vector. The object is displayed based on this rotation and the new 3D rotation value of the object is stored in memory. This process has the property of making the rotation very stable. For example, if the user moves the pointer back to the initial starting position on the screen display, the object will appear as the object was prior to the rotation.

An exemplary computer source code is provided below, which incorporates many of the techniques described. The source code can further be modified to include additional features or to vary the technique based on the descriptions above.

```
void
ArcBallManipulatorPart::handleMove(const gmath::Vec2d&
aMouseClickVertex,
                                    const gmath::Vec2d&
aMouseCurrentVertex,
                                    Qt::MouseButtons
/*aMouseButtons*/,
                                    ManipulatorPartEvents&
aManipulatorPartEvent)
{
    // Grow the ball to accommodate mouse clicks that start
outside the ball.
    updateSphereRadius(aMouseClickVertex);
    gmath::Vec3d translation = mXform.getTranslation( );
    mEndVec = mousePosToVec(aMouseCurrentVertex, translation,
mInvisibleBallRadius);
    gmath::Mat4d worldToObj =
ManipulatorUtil::getRotationMatrix(mParentXform).transpose( );
    // Convert the vectors from camera space back into world
space
    gmath::Vec3d us(mStartVec); us.normalize( );
    gmath::Vec3d ue(mEndVec); ue.normalize( );
    gmath::Mat4d viewModelRot =
ManipulatorUtil::getInverseRotationMatrix(context( ).view( )-
>modelView( ));
    gmath::Vec3d s = (us * viewModelRot) * worldToObj;
s.normalize( );
    gmath::Vec3d e = (ue * viewModelRot) * worldToObj;
e.normalize( );
    gmath::Mat4d rotation;
    rotation.setToRotation(s, e);
aManipulatorPartEvent.refValues( ).setValue(sDeltaRotationMatrix,
rotation);
}
gmath::Vec3d
ArcBallManipulatorPart::mousePosToVec2d(const gmath::Vec2d
&aMousePos, const gmath::Vec2d &aSphereCenter, double
aSphereRadius) const
{
    // Convert from screen space click location
    // to location relative to unit circle (radius 1)
    gmath::Vec2d pos = (aMousePos − aSphereCenter) /
aSphereRadius;
    // For the rotate ring, always project the click pos to the
flat surface.
    if (mRotateRingMode) {
        double d2 = pos.x( )*pos.x( ) + pos.y( )*pos.y( );
        double d = MAX(sqrt(d2), SMALLVALUE);
```

-continued

```
        return gmath::Vec3d(pos.x( )/d, pos.y( )/d, 0);
    }
    // Solve 2D circle equation to project
    // from x position on ground plane up into circle
    // x^2 + y^2 = r^2
    // Solve for y, which will actually be our z value
        double x2 = pos.x( )*pos.x( ) + pos.y( )*pos.y( );
        if (x2 <= 1.0) {
#define COSINE_FALLOFF 1
#if COSINE_FALLOFF
#define FALLOFF_FUNC(d) cos(pow(d,1.3)*(PI/2))
            double x = sqrt(x2);
            double h = FALLOFF_FUNC(x);
            gmath::Vec3d v(pos.x( ), pos.y( ), h);
            v.normalize( );
            return v;
#else
            double y = sqrt(1.0 – x2);
            return gmath::Vec3d(pos.x( ), pos.y( ), y);
#endif
        } else {
            double x = sqrt(x2);
            return gmath::Vec3d(pos.x( )/x, pos.y( )/x, 0);
        }
}
```

Figure 6:
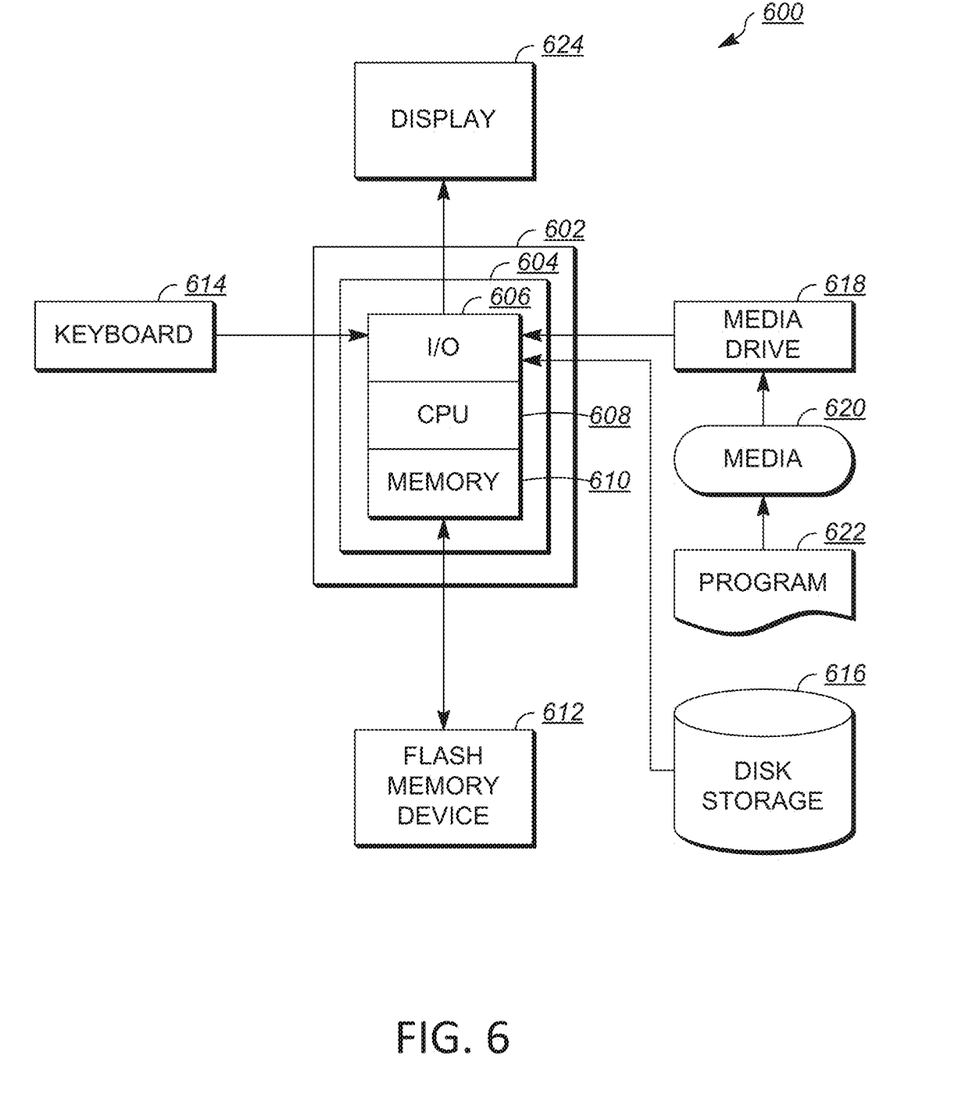
FIG. 6 depicts an exemplary computing system that may be used for manipulating 3D objects in a virtual 3D environment according to various embodiments.

FIG. 6 depicts an exemplary computing system 600 configured to perform any one of the above-described processes. In this context, computing system 600 may include, for example, a processor, memory, storage, and input/output devices (e.g., monitor, keyboard, touch screen, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform the above-described processes. The main system 602 includes a motherboard 604 having an input/output ("I/O") section 606, one or more central processing units ("CPU") 608, and a memory section 610, which may have a flash memory device 612 related to it. The I/O section 606 is connected to a display 624, a keyboard 614, a disk storage unit 616, and a media drive unit 618. The media drive unit 618 can read/write a computer-readable medium 620, which can contain programs 622 and/or data. The I/O section 606 may also connect to cloud storage using, for example, cellular data communications or wireless local area network communications.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Perl, C, C++, Java) or some specialized application-specific language.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A computer-implemented method for manipulating a virtual three-dimensional (3D) object in a virtual 3D space, the method comprising:
    displaying a representation of the 3D object on a display;
    determining a non-hemispherical arcball having a surface;
    associating the non-hemispherical arcball with the representation of the 3D object;
    detecting a pointing device at a first position and at a second position;
    translating the first position of the pointing device onto a first location on the surface of the non-hemispherical arcball;
    translating the second position of the pointing device onto a second location on the surface of the non-hemispherical arcball;
    displaying a rotation of the representation of the 3D object on the display, the rotation based on a path of travel between the first location and the second location along the surface of the non-hemispherical arcball; and
    wherein the non-hemispherical arcball has a base with a circular circumference, the base having a center, and the non-hemispherical arcball has a radius that varies as measured from the center of the base to the surface of the non-hemispherical arcball.

2. The computer-implemented method of claim 1, further comprising:
    determining a first vector, the first vector extending from the center of the base to the first location on the surface of the non-hemispherical arcball;
    determining a second vector, the second vector extending from the center of the base to the second location on the surface of the non-hemispherical arcball;
    calculating a first degree of rotation in a first dimension, the first degree of rotation calculated by determining a first angle between the first vector and the second vector; and
    wherein displaying the rotation of the representation of the 3D object on the display comprises rotating the representation of the 3D object in the first dimension based on the calculated first degree of rotation.

3. The computer-implemented method of claim 2, further comprising:
    calculating a second degree of rotation in a second dimension, the second degree of rotation calculated by determining a second angle between the first vector and the second vector;
    wherein displaying the rotation of the representation of the 3D object on the display comprises rotating the representation of the 3D object in the second dimension based on the calculated second degree of rotation;
    calculating a third degree of rotation in a third dimension, the third degree of rotation calculated by determining a third angle between the first vector and the second vector; and
    wherein displaying the rotation of the representation of the 3D object on the display comprises rotating the representation of the 3D object in the third dimension based on the calculated third degree of rotation.

4. The computer-implemented method of claim 1, further comprising:

determining a placement location in the 3D space, the placement location based on the center of the representation of the 3D object in the 3D space; and placing the non-hemispherical arcball in the 3D space based on the placement location.

5. The computer-implemented method of claim 1, further comprising:

determining a size of the non-hemispherical arcball, the size based on the first position of the pointing device; and wherein the base of the non-hemispherical arcball expands beyond a projection of the representation of the 3D object in 2D space.

6. The computer-implemented method of claim 1, further comprising:

determining a size of the non-hemispherical arcball, the size based on the first position of the pointing device; and wherein the non-hemispherical arcball fully encapsulates the representation of the 3D object.

7. The computer-implemented method of claim 1, further comprising:

storing a rotation value in computer memory, wherein the rotation value is based on the first position and the second position; and associating the rotation value with a mesh data structure, wherein displaying the rotation of the representation of the 3D object on the display uses the mesh data structure and the rotation value.

8. The computer-implemented method of claim 1, wherein detecting the pointing device comprises detecting a user interaction with a touch-sensitive device.

9. The computer-implemented method of claim 1, wherein determining the non-hemispherical arcball having the surface comprises selecting a shape for the non-hemispherical arcball based on the first position.

10. The computer-implemented method of claim 1, wherein determining the non-hemispherical arcball having the surface comprises determining a non-hemispherical arcball with a slope of less than 90 degrees at the edge of the non-hemispherical arcball.

11. The computer-implemented method of claim 10, wherein determining the non-hemispherical arcball having the surface comprises determining a non-hemispherical arcball with a slope between 70 degrees and 85 degrees at the edge of the non-hemispherical arcball.

12. The computer-implemented method of claim 1, wherein determining the non-hemispherical arcball having the surface comprises using an equation based on a cosine of the product: (a) radius raised to a power value and (b) pi divided by two.

13. The computer-implemented method of claim 12, wherein the power value is between 1.2 and 1.4.

14. A non-transitory computer-readable storage medium comprising computer-executable instructions for manipulating a virtual three-dimensional (3D) object in a virtual 3D space, the computer-executable instructions comprising instructions for:

displaying a representation of the 3D object on a display;

determining a non-hemispherical arcball having a surface;

associating the non-hemispherical arcball with the representation of the 3D object;

detecting a pointing device at a first position and at a second position;

translating the first position of the pointing device onto a first location on the surface of the non-hemispherical arcball;

translating the second position of the pointing device onto a second location on the surface of the non-hemispherical arcball;

displaying a rotation of the representation of the 3D object on the display, the rotation based on a path of travel between the first location and the second location along the surface of the non-hemispherical arcball; and wherein the non-hemispherical arcball has a base with a circular circumference, the base having a center, and the non-hemispherical arcball has a radius that varies as measured from the center of the base to the surface of the non-hemispherical arcball.

15. The non-transitory computer-readable storage medium of claim 14, further comprising:

determining a first vector, the first vector extending from the center of the base to the first location on the surface of the non-hemispherical arcball;

determining a second vector, the second vector extending from the center of the base to the second location on the surface of the non-hemispherical arcball;

calculating a first degree of rotation in a first dimension, the first degree of rotation calculated by determining a first angle between the first vector and the second vector; and wherein displaying the rotation of the representation of the 3D object on the display comprises rotating the representation of the 3D object in the first dimension based on the calculated first degree of rotation.

16. The non-transitory computer-readable storage medium of claim 15, further comprising:

calculating a second degree of rotation in a second dimension, the second degree of rotation calculated by determining a second angle between the first vector and the second vector;

wherein displaying the rotation of the representation of the 3D object on the display comprises rotating the representation of the 3D object in the second dimension based on the calculated second degree of rotation;

calculating a third degree of rotation in a third dimension, the third degree of rotation calculated by determining a third angle between the first vector and the second vector; and wherein displaying the rotation of the representation of the 3D object on the display comprises rotating the representation of the 3D object in the third dimension based on the calculated third degree of rotation.

17. The non-transitory computer-readable storage medium of claim 14, further comprising:

determining a placement location in the 3D space, the placement location based on the center of the representation of the 3D object in the 3D space; and placing the non-hemispherical arcball in the 3D space based on the placement location.

18. The non-transitory computer-readable storage medium of claim 14, further comprising:

determining a size of the non-hemispherical arcball, the size based on the first position of the pointing device; and wherein the base of the non-hemispherical arcball expands beyond a projection of the representation of the 3D object in 2D space.

19. The non-transitory computer-readable storage medium of claim 14, further comprising:

determining a size of the non-hemispherical arcball, the size based on the first position of the pointing device; and wherein the non-hemispherical arcball fully encapsulates the representation of the 3D object.

20. The non-transitory computer-readable storage medium of claim 14, further comprising:
storing a rotation value in computer memory, wherein the rotation value is based on the first position and the second position; and
associating the rotation value with a mesh data structure, wherein displaying the rotation of the representation of the 3D object on the display uses the mesh data structure and the rotation value.

21. The non-transitory computer-readable storage medium of claim 14, wherein detecting the pointing device comprises detecting a user interaction with a touch-sensitive device.

22. The non-transitory computer-readable storage medium of claim 14, wherein determining the non-hemispherical arcball having the surface comprises selecting a shape for the non-hemispherical arcball based on the first position.

23. The non-transitory computer-readable storage medium of claim 14, wherein determining the non-hemispherical arcball having the surface comprises determining a non-hemispherical arcball with a slope of less than 90 degrees at the edge of the non-hemispherical arcball.

24. The non-transitory computer-readable storage medium of claim 23, wherein determining the non-hemispherical arcball having the surface comprises determining a non-hemispherical arcball with a slope between 70 degrees and 85 degrees at the edge of the non-hemispherical arcball.

25. The non-transitory computer-readable storage medium of claim 14, wherein determining the non-hemispherical arcball having the surface comprises using an equation based on a cosine of the product: (a) radius raised to a power value and (b) pi divided by two.

26. The non-transitory computer-readable storage medium of claim 25, wherein the power value is between 1.2 and 1.4.

27. An apparatus for manipulating a virtual three-dimensional (3D) object in a virtual 3D space, the apparatus comprising:
a memory configured to store the 3D object; and
one or more computer processors configured to:
display a representation of the 3D object on a display;
determine a non-hemispherical arcball having a surface;
associate the non-hemispherical arcball with the representation of the 3D object;
detect a pointing device at a first position and at a second position;
translate the first position of the pointing device onto a first location on the surface of the non-hemispherical arcball;
translate the second position of the pointing device onto a second location on the surface of the non-hemispherical arcball;
display a rotation of the representation of the 3D object on the display, the rotation based on a path of travel between the first location and the second location along the surface of the non-hemispherical arcball; and
wherein the non-hemispherical arcball has a base with a circular circumference, the base having a center, and the non-hemispherical arcball has a radius that varies as measured from the center of the base to the surface of the non-hemispherical arcball.

28. The apparatus of claim 27, wherein the one or more computer processors further configured to:
determine a first vector, the first vector extending from the center of the base to the first location on the surface of the non-hemispherical arcball;
determine a second vector, the second vector extending from the center of the base to the second location on the surface of the non-hemispherical arcball;
calculate a first degree of rotation in a first dimension, the first degree of rotation calculated by determining a first angle between the first vector and the second vector; and
wherein displaying the rotation of the representation of the 3D object on the display comprises rotating the representation of the 3D object in the first dimension based on the calculated first degree of rotation.

29. The apparatus of claim 28, wherein the one or more computer processors further configured to:
calculate a second degree of rotation in a second dimension, the second degree of rotation calculated by determining a second angle between the first vector and the second vector;
wherein displaying the rotation of the representation of the 3D object on the display comprises rotating the representation of the 3D object in the second dimension based on the calculated second degree of rotation;
calculate a third degree of rotation in a third dimension, the third degree of rotation calculated by determining a third angle between the first vector and the second vector; and
wherein displaying the rotation of the representation of the 3D object on the display comprises rotating the representation of the 3D object in the third dimension based on the calculated third degree of rotation.

30. The apparatus of claim 27, wherein the one or more computer processors further configured to:
determine a placement location in the 3D space, the placement location based on the center of the representation of the 3D object in the 3D space; and
place the non-hemispherical arcball in the 3D space based on the placement location.

31. The apparatus of claim 27, wherein the one or more computer processors further configured to:
determine a size of the non-hemispherical arcball, the size based on the first position of the pointing device; and
wherein the base of the non-hemispherical arcball expands beyond a projection of the representation of the 3D object in 2D space.

32. The apparatus of claim 27, wherein the one or more computer processors further configured to:
determine a size of the non-hemispherical arcball, the size based on the first position of the pointing device; and
wherein the non-hemispherical arcball fully encapsulates the representation of the 3D object.

33. The apparatus of claim 27, wherein the one or more computer processors further configured to:
store a rotation value in computer memory, wherein the rotation value is based on the first position and the second position; and
associate the rotation value with a mesh data structure, wherein displaying the rotation of the representation of the 3D object on the display uses the mesh data structure and the rotation value.

34. The apparatus of claim 27, wherein detecting the pointing device comprises detecting a user interaction with a touch-sensitive device.

35. The apparatus of claim 27, wherein determining the non-hemispherical arcball having the surface comprises selecting a shape for the non-hemispherical arcball based on the first position.

36. The apparatus of claim 27, wherein determining the non-hemispherical arcball having the surface comprises determining a non-hemispherical arcball with a slope of less than 90 degrees at the edge of the non-hemispherical arcball.

37. The apparatus of claim 36, wherein determining the non-hemispherical arcball having the surface comprises determining a non-hemispherical arcball with a slope between 70 degrees and 85 degrees at the edge of the non-hemispherical arcball.

38. The apparatus of claim 27, wherein determining the non-hemispherical arcball having the surface comprises using an equation based on a cosine of the product: (a) radius raised to a power value and (b) pi divided by two.

39. The apparatus of claim 38, wherein the power value is between 1.2 and 1.4.

* * * * *